Dec. 15, 1936.  F. J. SCHNAUBELT  2,064,324
ELECTRIC STORAGE BATTERY
Filed March 13, 1935

INVENTOR
F. J. SCHNAUBELT
BY E. R. Nowlan
ATTORNEY

Patented Dec. 15, 1936

2,064,324

UNITED STATES PATENT OFFICE 2,064,324

ELECTRIC STORAGE BATTERY

Frank J. Schnaubelt, La Grange, Ill., assignor to Western Electric Company, Incorporated, New York, N. Y., a corporation of New York Application March 13, 1935, Serial No. 10,752

3 Claims. (Cl. 136—38)

This invention relates to electric storage batteries and more particularly to electrodes, plates or grids for such batteries.

In the usual type of storage battery electrode, plate or grid, which is preferably of cast lead or lead alloy, the sections or walls thereof, which separate the apertures formed therein for supporting the active material, have been of a uniform thickness throughout the entire plate or grid. Thus in the use of a battery employing positive grids of this type which are suspended from their upper portions, the sections of lead between the apertures over a period of time are converted into active material with the result that deterioration of the grid progresses to such an extent that the grid is weakened structurally, developing fractures and finally breaking in two along its middle portion or in the upper portion of the grid, where the grid is suspended, and at which portion the greatest stress occurs. This deleterious development in the grid, in most cases, occurs before the grid with the active material supported thereon, as a whole, has worn out or lost its effectiveness in the battery.

The primary object of this invention is to provide an efficient and practical storage battery electrode, plate or grid possessing a maximum structural strength at the portion of greatest stress.

In accordance with this object, one embodiment of this invention contemplates a cast lead or lead alloy storage battery electrode, plate or grid comprising a continuous outer border portion enclosing a grid portion. The grid portion is formed by providing a plurality of equally spaced horizontal rows of similar size apertures, the apertures of each individual row being similarly spaced from each other. At the upper portion of the grid the apertures of each row are horizontally spaced farther apart providing a larger section of lead between the apertures than in the lower portion of the grid to give greater structural strength to the upper portion thereof, which has to sustain a greater weight than the intermediate and lower portions, and thus materially lengthening the life of the grid as deterioration progresses while in active use in a battery. The intermediate portion of the grid may also have partition walls of greater width than the lower portion but preferably not so wide as those of the upper portion.

Figure 1:
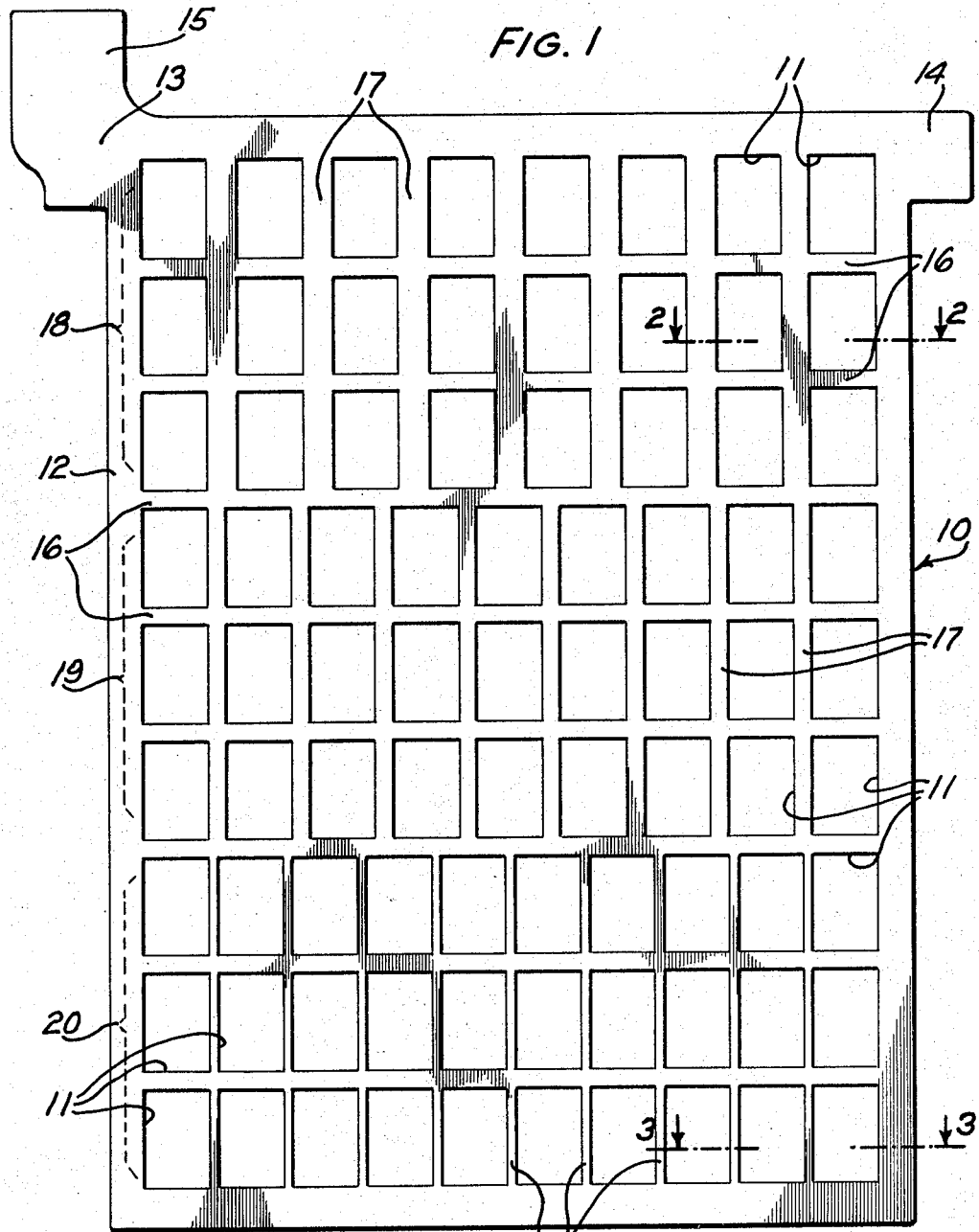
Figure 2:
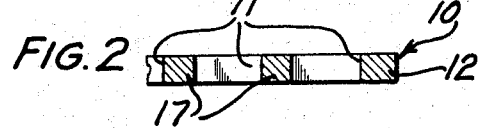
Figure 3:
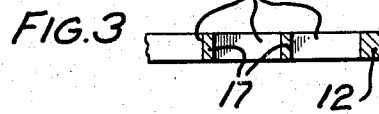

Other objects and advantages of the invention will be more readily understood from a consideration of the following description taken with the accompanying drawing, wherein Fig. 1 is a side view of a simple type of grid embodying the features of the invention, and Figs. 2 and 3 are fragmentary horizontal sections taken on the lines 2—2 and 3—3, respectively, of Fig. 1.

Referring now to the drawing one embodiment of an electric storage battery electrode, plate, or grid embodying the invention is indicated by the numeral 10. For the sake of clearness and brevity in illustrating and describing the invention a very simple form of electrode is shown, it being understood, of course, that the form and arrangement of the grid portion of the electrode may vary widely in practice and that the size, shape and arrangement of apertures 11 formed therein for supporting the active material (not shown) can be of any desired conventional type so long as their design and their arrangement permit the features of the invention to be embodied in the grid.

The grid portion is surrounded by a continuous outer border portion 12 having integral therewith at its opposite sides lugs 13 and 14, which when the electrode is in use in a battery engage cooperating supporting surfaces (not shown) for positioning and supporting the grid, the lug 13 being formed with a terminal extension 15. The apertures 11 in the grid portion are shown as rectangular in shape and arranged in horizontal rows, the apertures being of similar size and shape throughout the grid and extend in a vertical direction. In a vertical direction the several horizontal rows of apertures 11, are uniformly spaced from each other so that the thickness of the section of lead indicated at 16, is the same between the adjacent rows. Within each row the several apertures thereof are uniformly spaced from each other with the result that the thickness of the section of lead, indicated at 17, is the same therebetween.

It will be noted in the particular embodiment of the improved grid illustrated in the drawing that the several horizontal rows of apertures 11 are arranged in groups 18, 19 and 20, and wherein the thickness of the section of lead 17 extending in a horizontal direction between the apertures in each row of each of the groups is the same. It will also be observed that this referred to thickness of the section of lead 17 between the apertures 11 progressively decreases in each of the groups 18, 19 and 20, from the upper group 18 to the lower group 20.

It will be apparent that this additional thickness of the sections of lead 17 between each of the apertures 11 of the horizontal rows comprising the group 18 at the upper portion of the grid as compared to that of the sections of lead 17 between each of the apertures 11 of the groups 19 and 20 provides a greater structural strength at the portion of the grid which necessarily has to withstand the greatest stress since the entire weight of the grid is supported in the upper portion of the grid at the lugs 13 and 14.

The use of a grid of the above described type particularly when used as a positive grid suspended at its upper portion, with the apertures 11 filled with any of the usual types of active materials, in a storage battery will have a greatly increased active life over the type of grid, similarly used, wherein the sections or walls which separate the apertures thereof are of a uniform thickness throughout the grid. The additional lead between the horizontally spaced apertures 11 at the upper portion of the grid of this invention delays the weakening of the grid at this point to such an extent that the grid is not so weakened structurally that it breaks in two or collapses, until the electrode, as a whole, has substantially worn out or lost its effectiveness in the battery.

Although a specific embodiment of the invention has been described in detail hereinbefore, it is to be understood that modifications and adaptations may be made within the scope of the appended claims.

What is claimed is:

1. A storage battery grid having a plurality of horizontal rows of similar size apertures, the apertures of each individual row being similarly spaced from each other and the apertures of the upper rows being spaced farther apart than those of the lower rows so that more material of the grid is provided in a horizontal direction between the apertures in the upper portion of the grid than in the lower portion thereof.

2. A storage battery grid having a plurality of horizontal rows of apertures, said rows being separated by horizontal rectilinear portions of material, the vertical portions of material separating the apertures being progressively greater in number and the vertical separating portions smaller in thickness from top to bottom to provide a greater structural strength to the grid at its upper portion.

3. A storage battery grid having a plurality of horizontal rows of apertures arranged in groups with the apertures of the several rows within each group spaced by a thickness of the material of the grid having parallel sides, the thickness of the material between the apertures of the rows within each group progressively decreasing and the number of apertures progressively increasing from the upper group to the lower group to provide a greater structural strength to the grid at its upper portion.

FRANK J. SCHNAUBELT.